United States Patent
Takashima et al.

(10) Patent No.: US 8,198,774 B2
(45) Date of Patent: Jun. 12, 2012

(54) PERMANENT MAGNET MOTOR

(75) Inventors: Hiroshi Takashima, Yokohama (JP); Yuki Nakajima, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 281 days.

(21) Appl. No.: 11/885,884

(22) PCT Filed: Mar. 7, 2006

(86) PCT No.: PCT/JP2006/304346
§ 371 (c)(1),
(2), (4) Date: Sep. 7, 2007

(87) PCT Pub. No.: WO2006/095721
PCT Pub. Date: Sep. 14, 2006

(65) Prior Publication Data
US 2008/0169717 A1    Jul. 17, 2008

(30) Foreign Application Priority Data

Mar. 9, 2005  (JP) ................................ 2005-065153
Aug. 30, 2005  (JP) ................................ 2005-249674

(51) Int. Cl.
*H02K 1/27* (2006.01)
*H02K 21/12* (2006.01)
*H02K 21/46* (2006.01)
(52) U.S. Cl. ............... 310/156.43; 310/156.53; 310/191
(58) Field of Classification Search ............. 310/156.43, 310/156.53, 156.38, 156.57, 156.55, 156.56, 310/156.83, 156.84, 191, 190; *H02K 21/12, H02K 21/46, 21/24, 1/27*
See application file for complete search history.

(56) References Cited

U.S. PATENT DOCUMENTS

| | | | | |
|---|---|---|---|---|
| 5,097,166 A | * | 3/1992 | Mikulic | 310/156.83 |
| 5,632,093 A | * | 5/1997 | Elias | 33/366.25 |
| 6,037,691 A | * | 3/2000 | Akemakou | 310/191 |
| 6,072,257 A | * | 6/2000 | Akemakou | 310/191 |

(Continued)

FOREIGN PATENT DOCUMENTS

JP  05-236714 A  9/1993

(Continued)

OTHER PUBLICATIONS

"contact." Dictionary.com Unabridged. Random House, Inc. Mar. 30, 2011. <Dictionary.com http://dictionary.reference.com/browse/contact>.*

*Primary Examiner* — Quyen Leung
*Assistant Examiner* — Michael Andrews
(74) *Attorney, Agent, or Firm* — Foley & Lardner LLP

(57) ABSTRACT

A motor includes: a stator (12) having coils; a rotor (11), which is disposed inside the stator and has a plurality of magnets; and a magnetic path switching part (18), which is provided in the rotor (11) and switches a magnetic path of the rotor (11) to select intense field control as a forward salient-pole structure or weak field control as an inverse salient-pole structure. The magnetic path switching part (18) is formed by use of a member having magnetic anisotropy, which is arranged on a magnetic path connecting magnets (13) of the same pole and a magnetic path connecting magnets (13) of different poles in the rotor (11). By changing the magnetic anisotropy of the member, the forward salient-pole structure and the inverse salient-pole structure are switched therebetween.

11 Claims, 16 Drawing Sheets

U.S. PATENT DOCUMENTS

| | | | |
|---|---|---|---|
| 6,376,959 B1 * | 4/2002 | Leupold | 310/191 |
| 6,489,694 B1 * | 12/2002 | Chass | 310/152 |
| 6,815,857 B2 | 11/2004 | Akatsu | |
| 2003/0230948 A1 * | 12/2003 | Murakami et al. | 310/156.53 |

FOREIGN PATENT DOCUMENTS

| | | |
|---|---|---|
| JP | 5-236714 A | 9/1993 |
| JP | 09-233887 A | 9/1997 |
| JP | 2002-058223 A | 2/2002 |
| JP | 2003-299330 A | 10/2003 |
| JP | 2004-072978 A | 3/2004 |
| JP | 2004-242462 | 8/2004 |
| JP | 2004-242462 A | 8/2004 |
| JP | 2004-245192 | 9/2004 |
| JP | 2004-245192 A | 9/2004 |
| JP | 2004343842 A * | 12/2004 |

* cited by examiner

FIG. 2
(a)
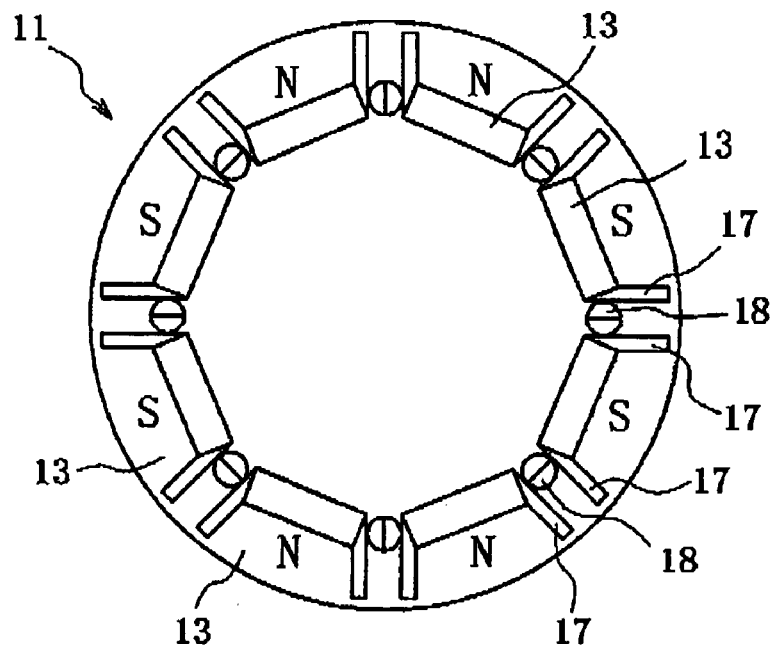
(b)
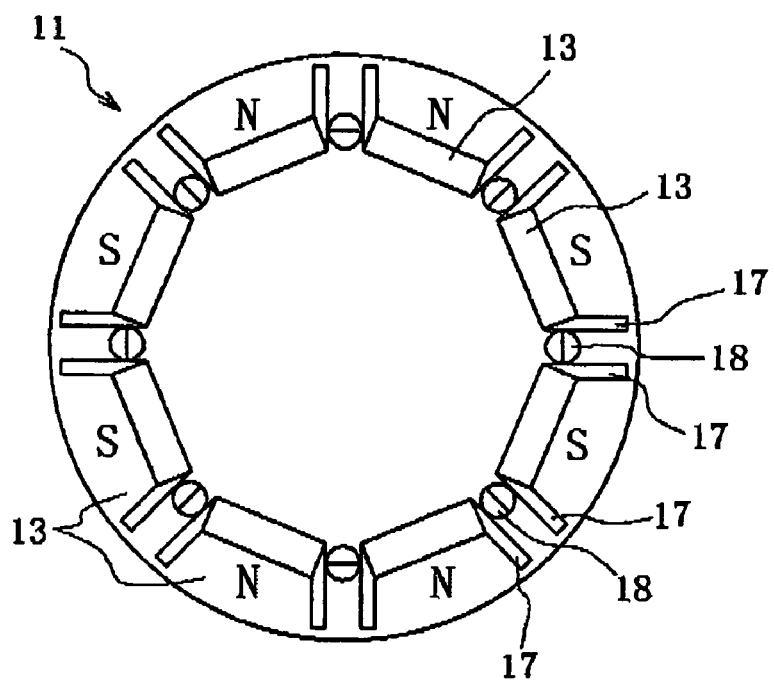

FIG. 3
(a)
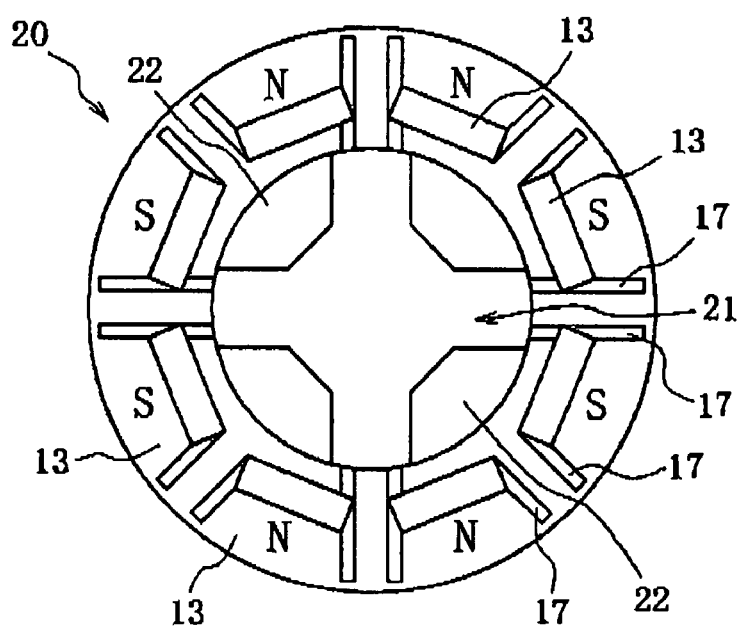
(b)
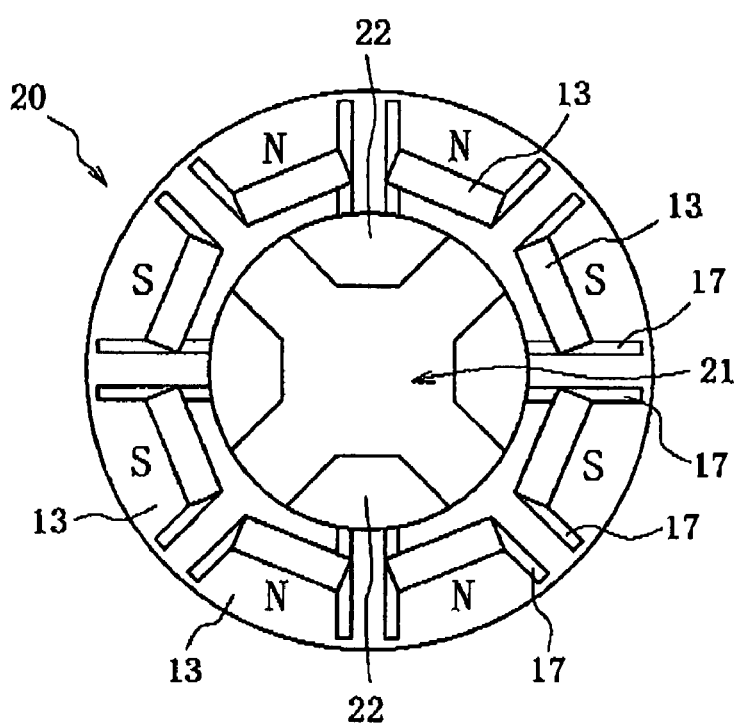

FIG. 9
(a)
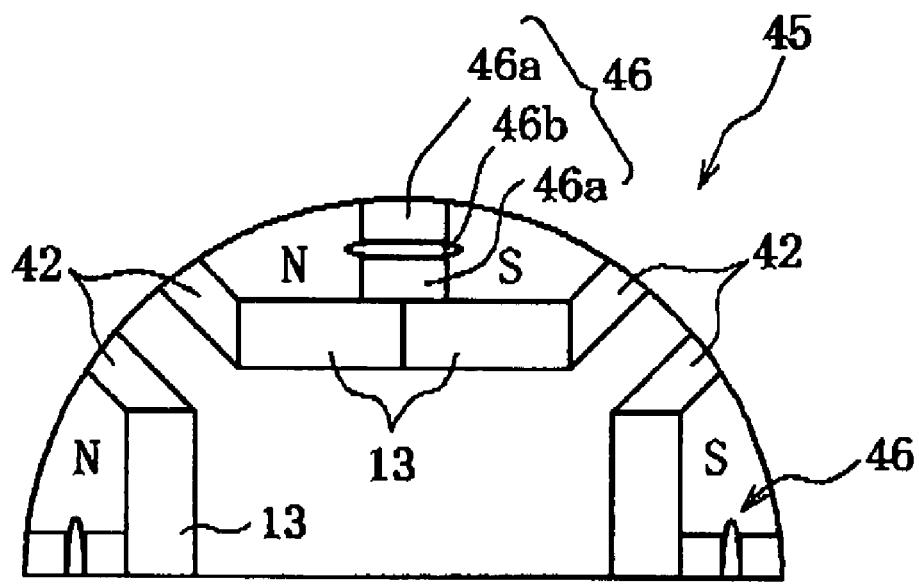
(b)
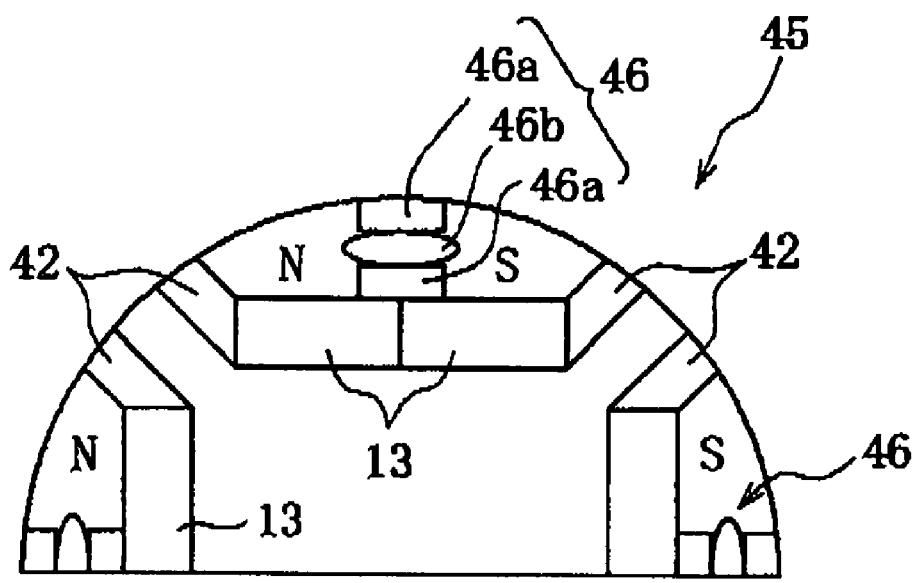

FIG. 10
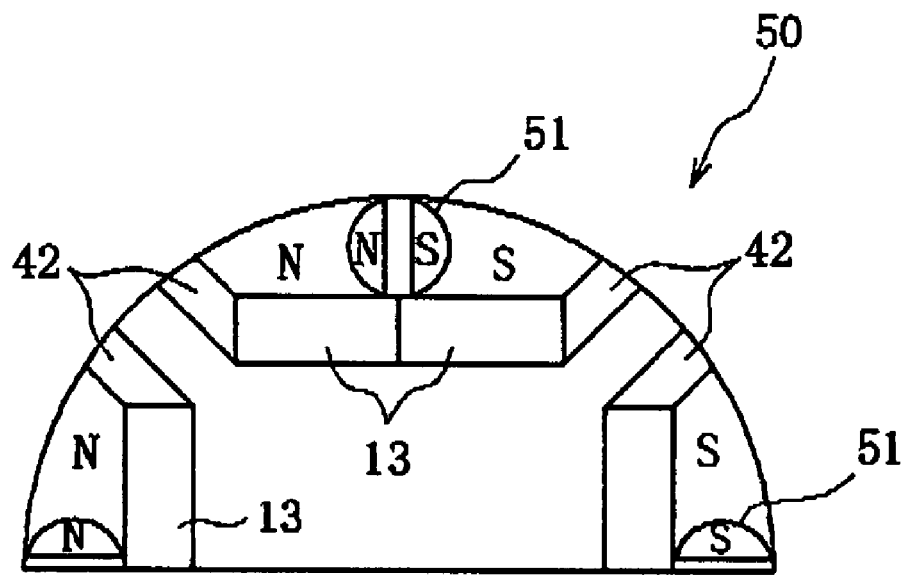
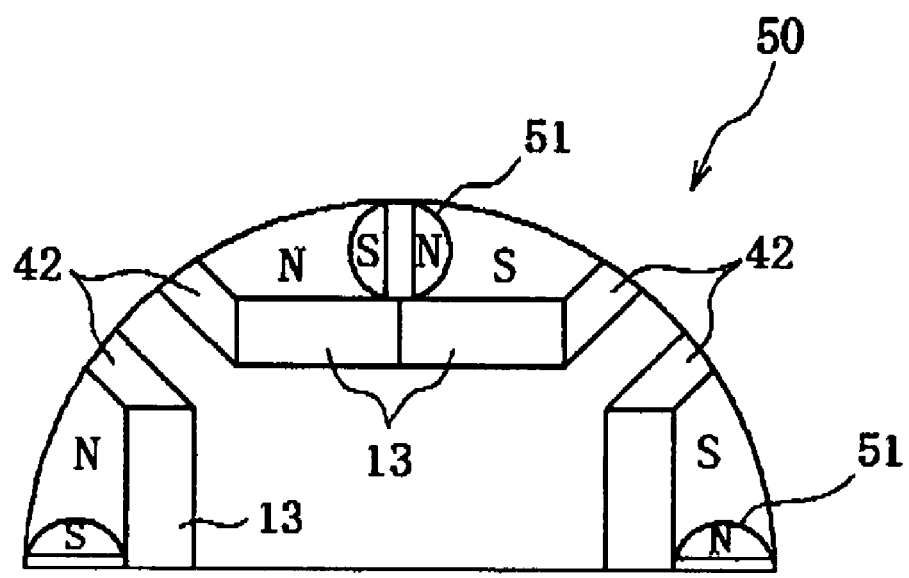

FIG. 11
(a)
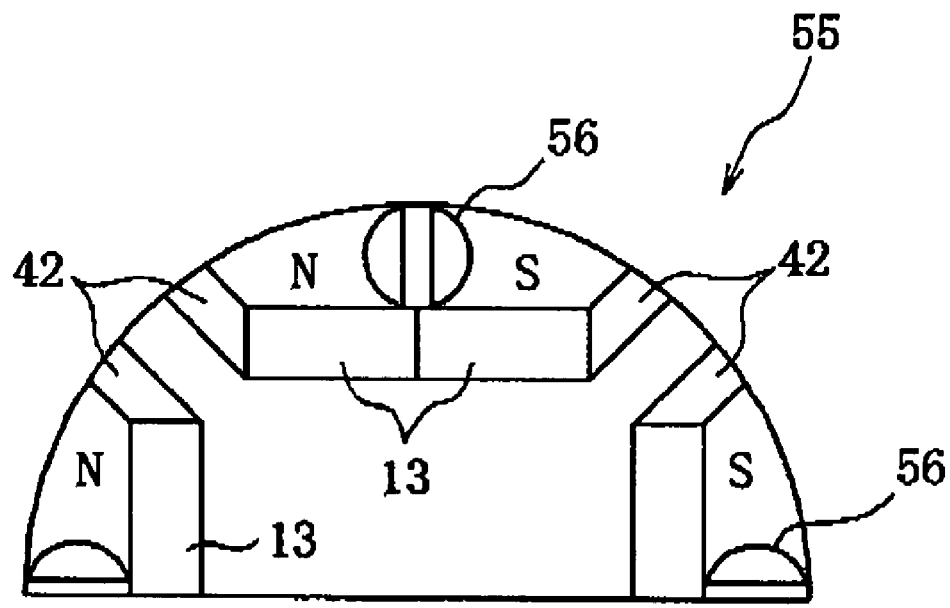
(b)
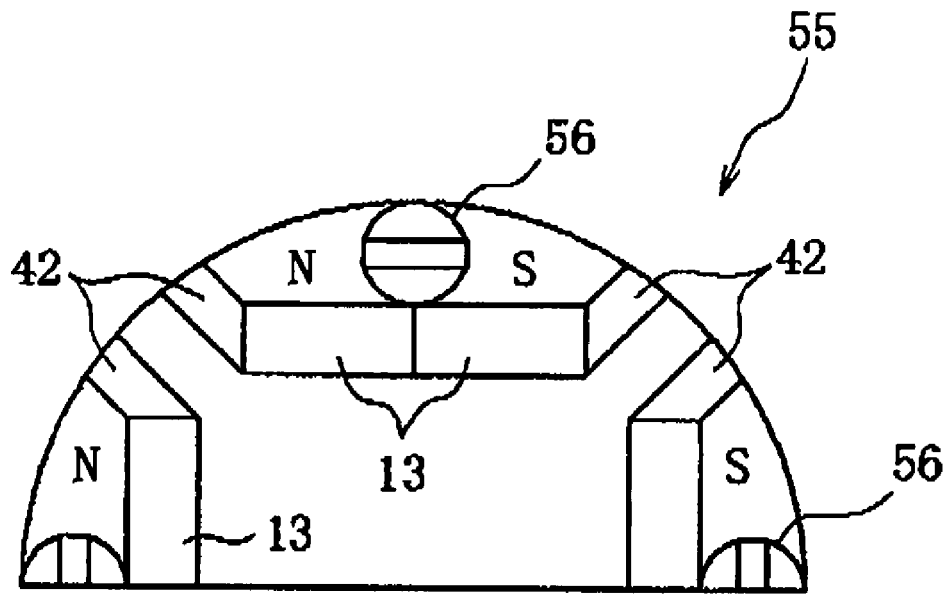

FIG. 12
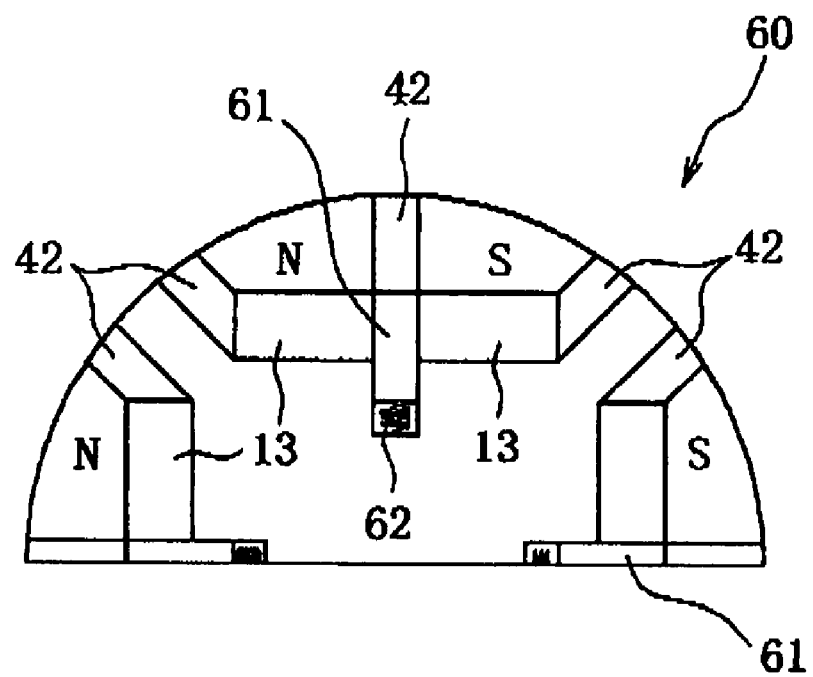
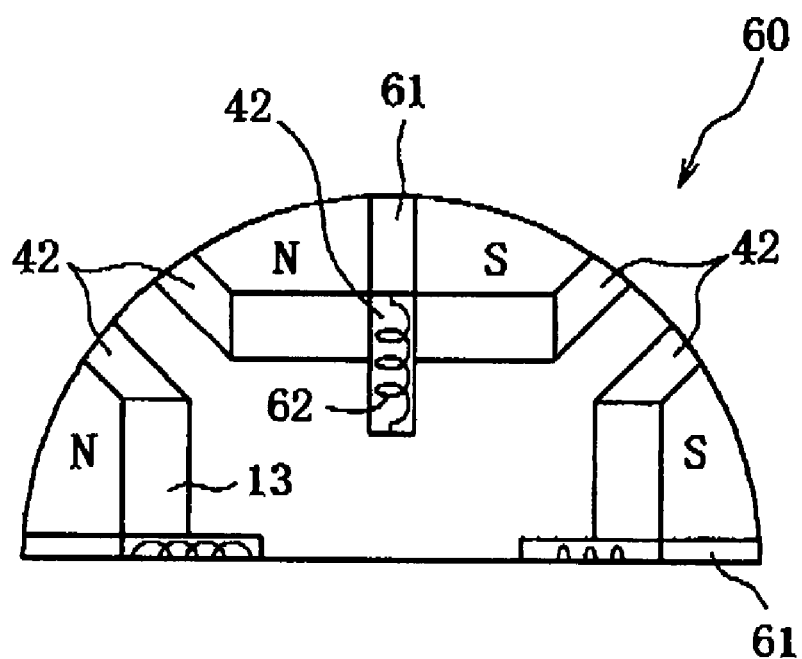

FIG. 13
(a)
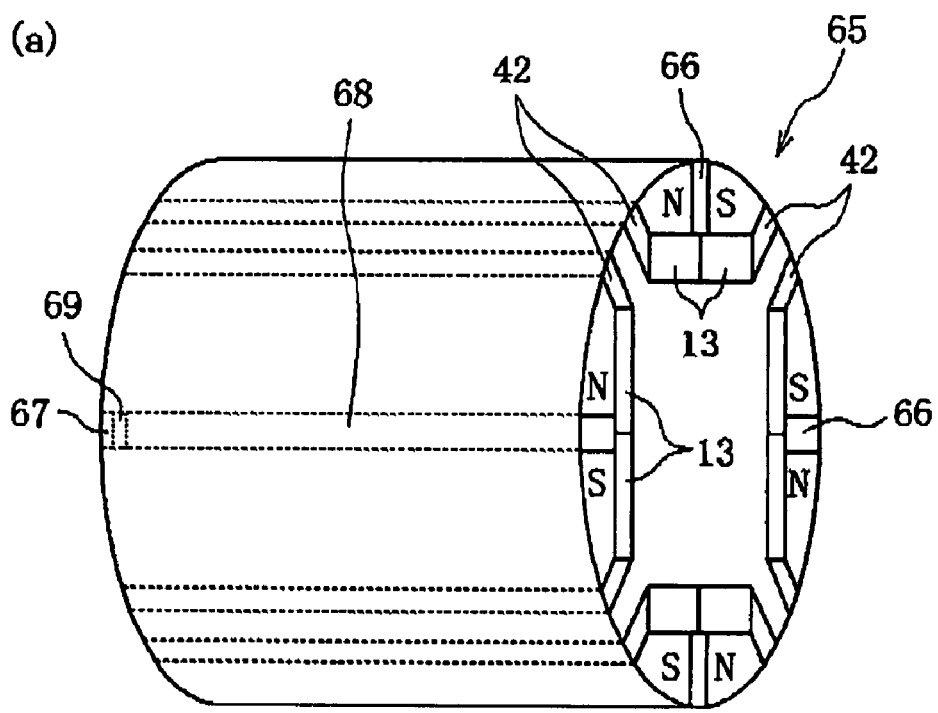
(b)
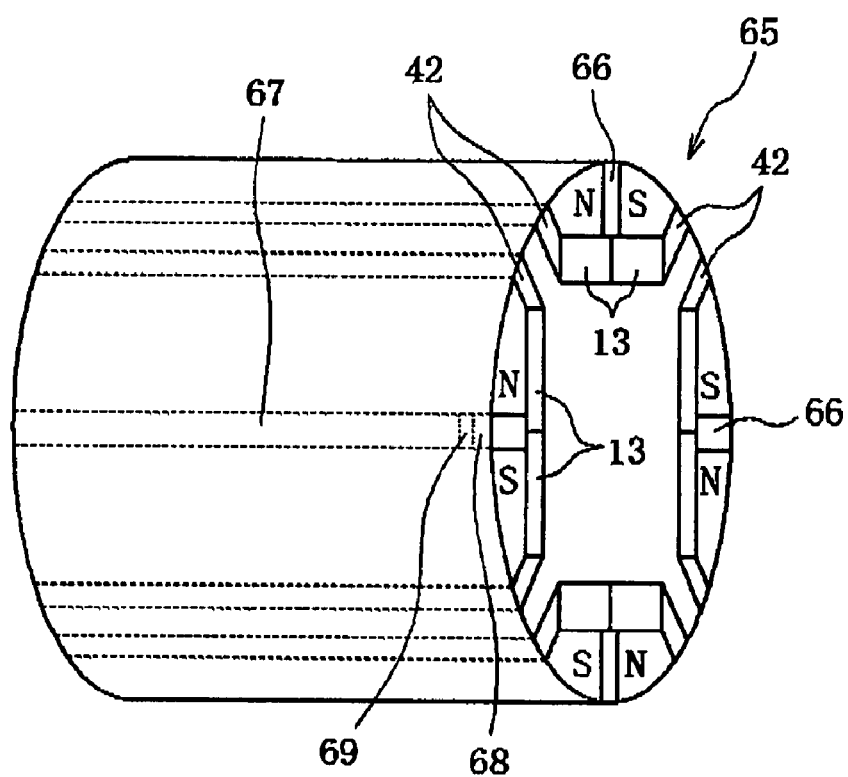

FIG. 14
(a)
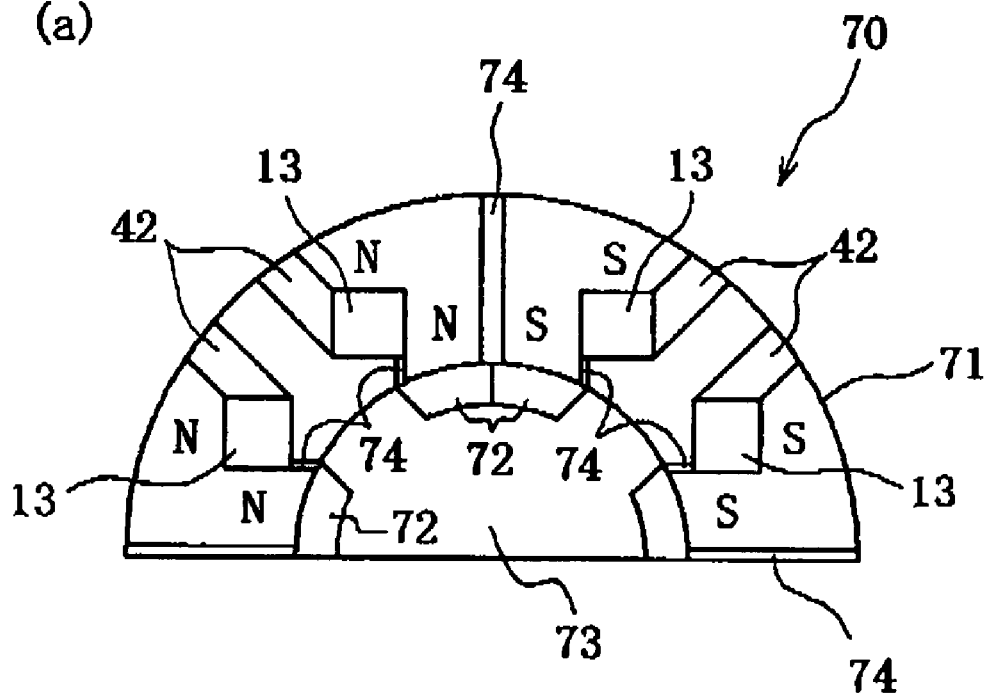
(b)
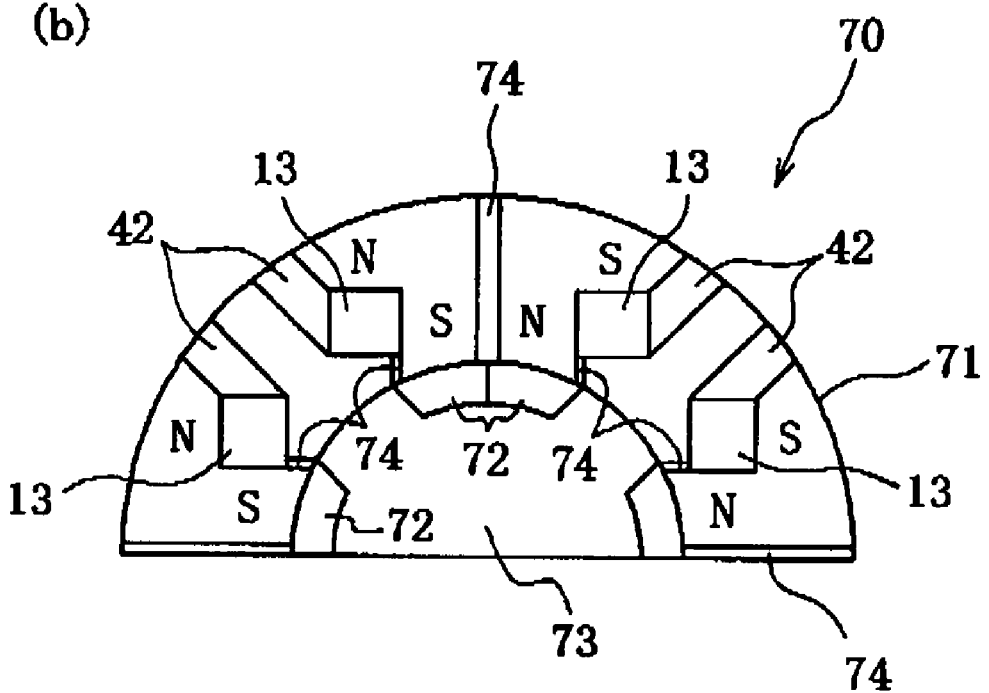

FIG. 15
(a)
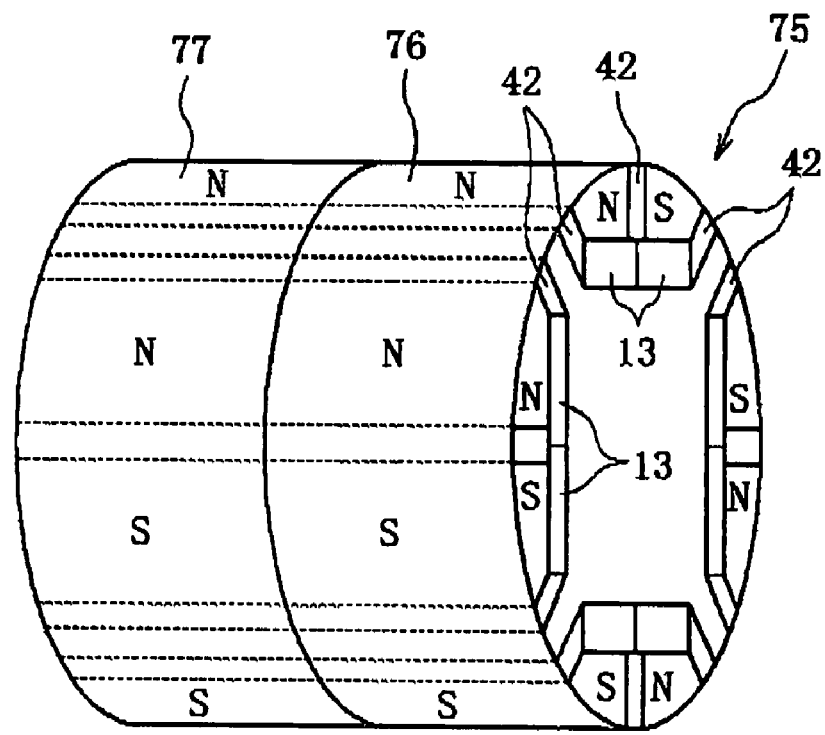
(b)
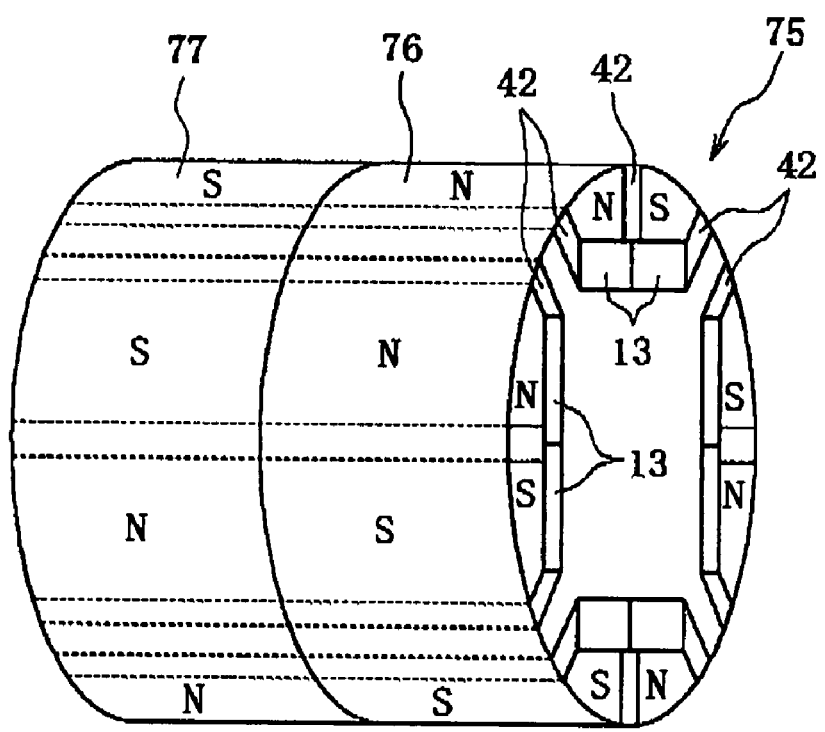

FIG. 18
(a)
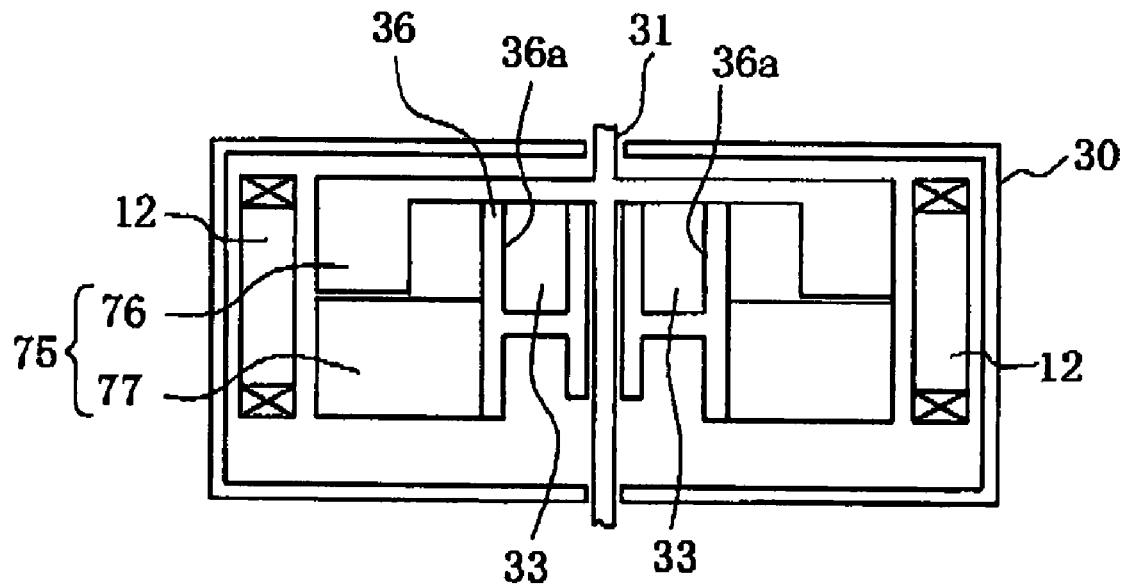
(b)
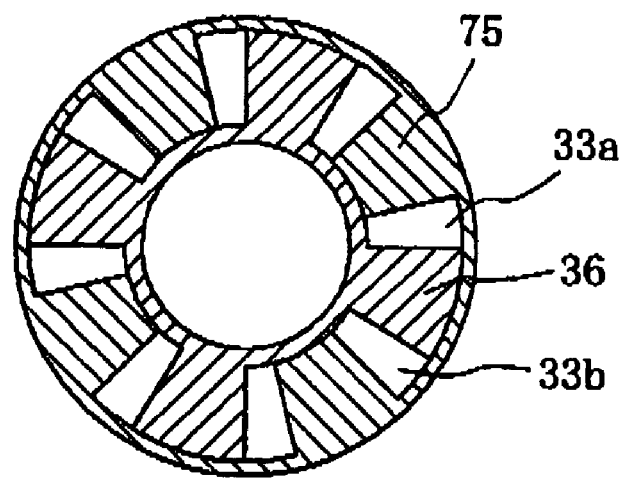

PERMANENT MAGNET MOTOR

TECHNICAL FIELD

The present invention relates to a motor, and more particularly relates to a motor which includes a rotor having permanent magnets and a stator having a coil, and which can select between two kinds of structures, a forward salient-pole structure and an inverse salient-pole structure.

BACKGROUND ART

There has heretofore been known a permanent magnet (PM) motor including a cylindrical stator having coils and a rotor which is disposed inside the stator, and which has permanent magnets buried therein. In the PM motor, the rotor is rotated by allowing currents to sequentially flow through a plurality of coils provided in the stator to cause mutual interaction between a rotating magnetic field generated in the coils and a magnetic field generated by the permanent magnets in the rotor. In such a PM motor, the number of revolutions is controlled according to a speed at which the coils for supplying the currents are sequentially switched.

Specifically, in the PM motor, induced electromotive force corresponding to the number of revolutions of the rotor is generated in the stator by the rotation of the rotor having the permanent magnets. This induced electromotive force is generated in a direction of canceling a voltage applied to the coils in the stator from outside. Thus, the maximum number of revolutions of the PM motor is limited to be not higher than a voltage to be applied to the coils from the outside by the induced voltage.

For example, in the conventional PM motor, a phase difference between an outer rotor and an inner rotor is controlled so as to enable reduction in the induced voltage by forming a path through which magnetic fluxes flow inside the rotor in high-speed rotation, and thus reducing the amount of magnetic fluxes flowing through the stator (see Japanese Patent Application Laid-Open Publication No. 2004-072978).

DISCLOSURE OF THE INVENTION

As to control of the motor, intense field control, which enables high torque to be obtained, and weak field control, which enables high-speed rotation by reducing counter electromotive force to facilitate a flow of driving currents, have been known. Moreover, a structure having forward salient-pole characteristics is suitable for the intense field control, and a structure having inverse salient-pole characteristics is suitable for the weak field control. Thus, if it is possible to arbitrarily select between two kinds of structures, a forward salient-pole structure and an inverse salient-pole structure, both high torque and high-speed rotation (high power) can be achieved.

However, in the conventional PM motor, it is not possible to arbitrarily select between the two kinds of structures, the forward salient-pole structure and the inverse salient-pole structure. Thus, both high torque and high-speed rotation (high power) cannot be achieved.

The present invention was made to solve the foregoing problems. It is an object of the present invention to provide a motor with both forward salient-pole characteristics and inverse salient-pole characteristics, which are opposite to each other. The motor can efficiently perform intense field control and weak field control, and accordingly enables a wide-ranging operation while achieving both high torque and high-speed rotation.

A motor according to a first aspect of the present invention includes: a stator having coils; a rotor, which is disposed inside the stator and has a plurality of magnets; and a magnetic path switching part, which is provided in the rotor and switches a magnetic path of the rotor to select between intense field control as a forward salient-pole structure and weak field control as an inverse salient-pole structure.

A motor according to a second aspect of the present invention includes: a stator having first coils; a rotor, which is disposed inside the stator, has a plurality of magnets, and also has magnetic reluctance smaller in a magnetic path between the same poles of the magnets than in a magnetic path between different poles of the magnets; and a magnetic flux short-circuiting mechanism, which is provided in the rotor and changes a short-circuit flux content inside the rotor according to the number of revolutions of the rotor.

BRIEF DESCRIPTION OF THE DRAWINGS

FIG. 2 shows the rotor in FIG. 1: FIG. 2(a) is a plan view showing forward salient-pole characteristics obtained by magnetic path switching parts, and FIG. 2(b) is a plan view showing inverse salient-pole characteristics obtained by the magnetic path switching parts.

FIG. 3 shows a rotor according to a second embodiment of the present invention: FIG. 3(a) is a plan view showing forward salient-pole characteristics obtained by magnetic path switching parts, and FIG. 3(b) is a plan view showing inverse salient-pole characteristics obtained by the magnetic path switching parts.

FIG. 5(a) shows a state when a voltage is applied, and FIG. 5(b) shows a state when no voltage is applied.

FIG. 6(a) is a schematic cross-sectional view along a rotating shaft, and FIG. 6(b) is a plan view showing a hydraulic mechanism.

FIG. 7(a) is a schematic cross-sectional view along a rotating shaft, and FIG. 7(b) is a plan view showing a hydraulic mechanism.

FIG. 9 shows a rotor in a motor according to a sixth embodiment of the present invention: FIG. 9(a) is a cross-sectional view showing a 180-degree model in low-speed rotation, and FIG. 9(b) is a cross-sectional view showing the 180-degree model in high-speed rotation.

FIG. 10 shows a rotor in a motor according to a seventh embodiment of the present invention: FIG. 10(a) is a cross-sectional view showing a 180-degree model in low-speed rotation, and FIG. 10(b) is a cross-sectional view showing the 180-degree model in high-speed rotation.

FIG. 11 shows a rotor in a motor according to an eighth embodiment of the present invention: FIG. 11(a) is a cross-sectional view showing a 180-degree model in low-speed rotation, and FIG. 11(b) is a cross-sectional view showing the 180-degree model in high-speed rotation.

FIG. 12 shows a rotor in a motor according to a ninth embodiment of the present invention: FIG. 12(a) is a cross-sectional view showing a 180-degree model in low-speed rotation, and FIG. 12(b) is a cross-sectional view showing the 180-degree model in high-speed rotation.

FIGS. 13(a) and 13(b) are perspective views in low-speed rotation and in high-speed rotation, showing a rotor in a motor according to a tenth embodiment of the present invention.

FIG. 14 shows a rotor in a motor according to an eleventh embodiment of the present invention: FIG. 14(a) is a cross-sectional view showing a 180-degree model in low-speed rotation, and FIG. 14(b) is a cross-sectional view showing the 180-degree model in high-speed rotation.

FIGS. 15(a) and 15(b) are perspective views in low-speed rotation and in high-speed rotation, showing a rotor in a motor according to a twelfth embodiment of the present invention.

FIG. 18 shows an example of a phase control mechanism according to the twelfth embodiment: FIG. 18(a) is a schematic cross-sectional view along a rotating shaft, and FIG. 18(b) is a plan view showing a hydraulic mechanism.

BEST MODES FOR CARRYING OUT THE INVENTION

With reference to the drawings, embodiments of the present invention will be described below.

First Embodiment

Figure 1:
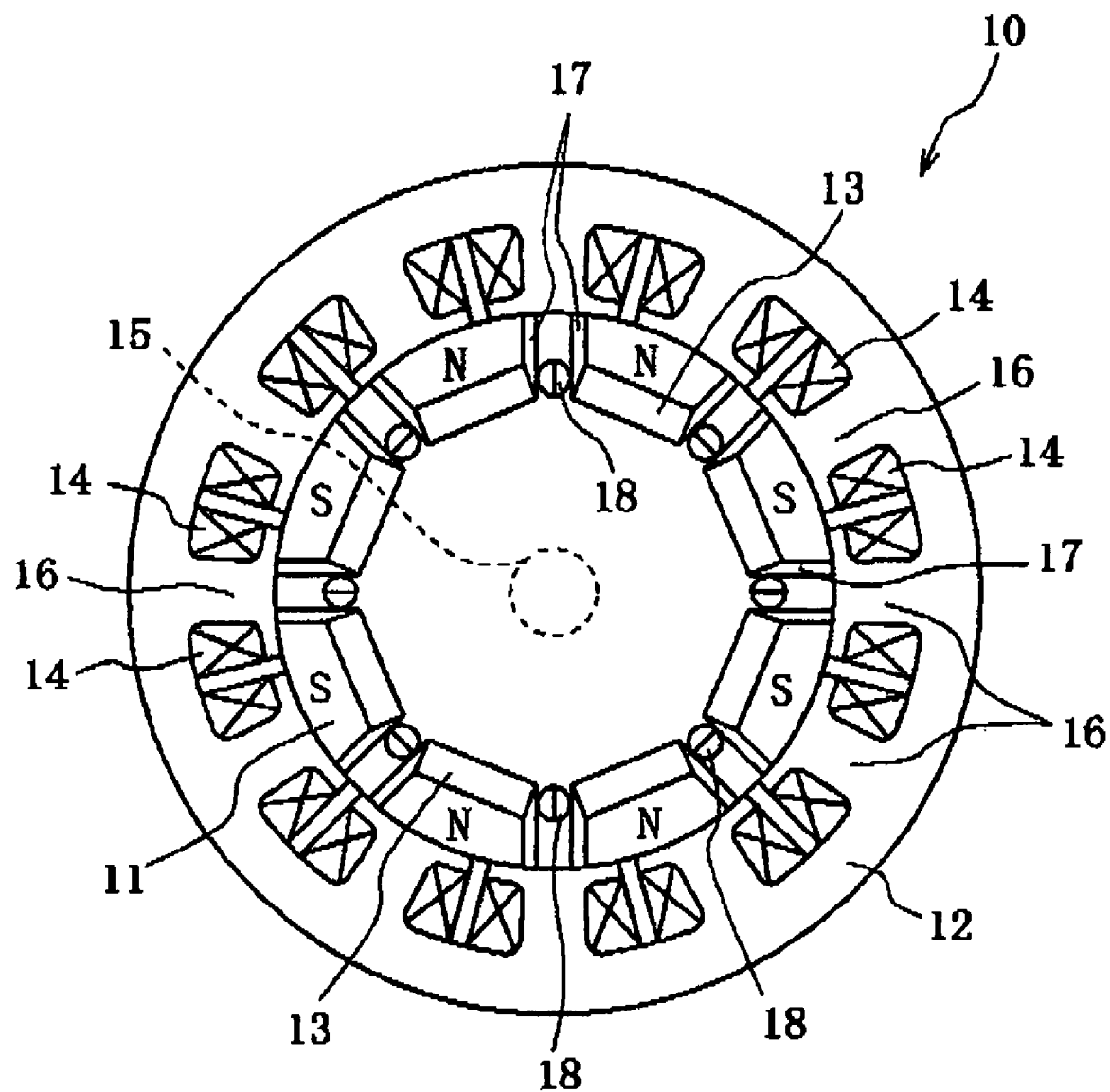
FIG. 1 is a radial cross-sectional view showing a stator and a rotor in a motor according to a first embodiment of the present invention.

FIG. 1 is a radial cross-sectional view showing a stator and a rotor in a motor according to a first embodiment of the present invention. As shown in FIG. 1, a motor 10 includes a rotor 11 and a stator 12. The rotor 11 has magnets (permanent magnets) 13, and the stator 12 has field coils 14. The rotor 11 has a rotating shaft 15 disposed perpendicularly to a surface of the rotor 11, and the rotating shaft 15 is rotatably held by a case (not shown).

The stator 12 is formed into a cylindrical shape by stacking circular ferromagnetic steel plates along a central axis direction of the rotating shaft 15. On an inner circumferential side of the stator 12, a plurality of slots 16 for winding the coils 14 which generate a rotating magnetic field are disposed approximately equally spaced apart from each other in an inner circumferential direction so as to protrude toward the rotating shaft 15.

The rotor 11 rotatably attached to the stator 12 is similarly formed into a cylindrical shape by stacking circular ferromagnetic steel plates along the central axis direction of the rotating shaft 15, as in the case of the stator 12. In an outer circumferential portion of the rotor 11, a predetermined number of (8 in this example) magnets 13 are fixed so as to be approximately equally spaced apart from each other and also to have north poles and south poles alternately arranged two by two along a circumferential direction. On the outsides of the respective magnets 13 in an arrangement direction thereof, air gaps 17 are provided along a radial direction of the rotor. Moreover, between the adjacent air gaps 17, in other words, between the adjacent magnets 13, magnetic path switching parts 18 are provided with the air gaps 17 interposed therebetween.

The magnetic path switching parts 18 consist of members having magnetic anisotropy and can select intense field control as a forward salient-pole structure or weak field control as an inverse salient-pole structure by changing the magnetic anisotropy and thus switching a magnetic path of the rotor 11. Specifically, the magnetic path switching parts 18 consist of members having magnetic anisotropy, which are disposed on magnetic paths connecting the magnets 13 of the same pole and on magnetic paths connecting the magnets 13 of different poles in the rotor 11. The magnetic path switching parts 18 switch between the forward salient-pole structure and the inverse salient-pole structure by changing the magnetic anisotropy of the members. The members having the magnetic anisotropy can be formed, for example, by use of electromagnetic steel plates, each having a slit in its center. Note that, in the case of switching the magnetic path, all of the magnetic path switching parts 18 are operated in synchronization with each other.

FIG. 2 shows the rotor in FIG. 1. FIG. 2(a) shows forward salient-pole characteristics obtained by the magnetic path switching parts, and FIG. 2(b) shows inverse salient-pole characteristics obtained by the magnetic path switching parts. As shown in FIG. 2(a), in the rotor 11, the magnetic path switching parts 18 between the magnets 13 of the same pole (between the north poles and between the south poles) have anisotropy in the radial direction of the rotor 11, and the magnetic path switching parts 18 between the magnets 13 of different poles (between the north pole and the south pole) have anisotropy in the circumferential direction of the rotor 11. Thus, the rotor 11 is set to have the forward salient-pole structure and shows the forward salient-pole characteristics.

As shown in FIG. 2(b), in the rotor 11, the magnetic path switching parts 18 between the magnets 13 of the same pole (between the north poles and between the south poles) have anisotropy in the circumferential direction of the rotor 11, and the magnetic path switching parts 18 between the magnets 13 of different poles (between the north pole and the south pole) have anisotropy in the radial direction of the rotor 11. Thus, the rotor 11 is set to have the inverse salient-pole structure and shows the inverse salient-pole characteristics.

As described above, the magnetic path switching parts 18 are provided in the rotor 11 to enable the following operation. Specifically, in low-speed rotation, intense field control for obtaining high torque can be performed by switching the magnetic path to set to have the forward salient-pole structure. By contrast, in high-speed rotation not lower than a rated speed, weak field control can be performed by switching the magnetic path to set to have the inverse salient-pole structure. Thus, the motor 10 having the rotor 11 described above has both the forward salient-pole characteristics and the inverse salient-pole characteristics, which are opposite to each other, and can efficiently perform the intense field control and the weak field control. Thus, it is possible to perform a wide-ranging operation which achieves both high torque and high-speed rotation. Moreover, since magnetic flux is increased by the intense field control in the forward salient-pole structure, the number of the magnets can be reduced if the magnetic flux is the same as that of a general interior permanent magnet (IPM) motor. Furthermore, reduction in the number of the magnets leads not only to cost reduction but also to a higher rated speed. Thus, a more wide-ranging operation is made possible.

Second Embodiment

FIG. 3 shows a rotor according to a second embodiment of the present invention. FIG. 3(a) shows forward salient-pole characteristics obtained by magnetic path switching parts, and FIG. 3(b) shows inverse salient-pole characteristics obtained by the magnetic path switching parts. As shown in FIG. 3, in this rotor 20, a magnetic path is switched by use of a magnetic path switching part 21 rotatably provided along a plane of the rotor 20 on the inner side of the respective magnets 13 in a radial direction of the rotor 20. Both air gaps 17 provided parallel to each other between the magnets 13 of the same pole are extended to an outer circumferential edge of the magnetic path switching part 21 so as to correspond to the magnetic path switching part 21. Other configurations and operations are the same as those of the rotor 11 in the first embodiment.

The magnetic path switching part 21 has a shape like a rotor of an SR (Switched Reluctance) motor, for example. Moreover, the magnetic path switching part 21 has approximately fan-shaped air gaps 22, which are disposed at four positions equally spaced apart from each other in an outer circumferential portion of a disk-shaped surface of the magnetic path switching part 21, and which also constitute a part of the outer circumference of the magnetic path switching part 21.

Accordingly, by turning the magnetic path switching part 21, the rotor 20 shows forward salient-pole characteristics (see FIG. 3(a)) obtained when a phase between the magnets 13 of the same pole coincides with a phase of a salient-pole portion of the magnetic path switching part 21, or shows inverse salient-pole characteristics (see FIG. 3(b)) obtained when a phase between the magnets 13 of different poles coincides with the phase of the salient-pole portion of the magnetic path switching part 21.

As described above, the magnetic path switching part 21 consists of a member which is provided in the rotor 11 and has a salient-pole portion that can have its phase selectively coincide with the phase between the magnets 13 of the same pole or the phase between the magnets 13 of different poles in the rotor 11. Thus, a forward salient-pole structure and an inverse salient-pole structure are switched therebetween by changing a target with which the member has its phase coincide. Specifically, the rotor 20 functions as a first rotor which mainly obtains magnet torque, and the magnetic path switching part 21 functions as a second rotor which varies the magnetic path. Moreover, phase control between the rotor 20 and the magnetic path switching part 21 which varies the magnetic path is performed to switch between the forward salient-pole structure and the inverse salient-pole structure. Thus, it is possible to carry out a wide-ranging operation which achieves both high torque and high-speed rotation.

Third Embodiment

Figure 4:
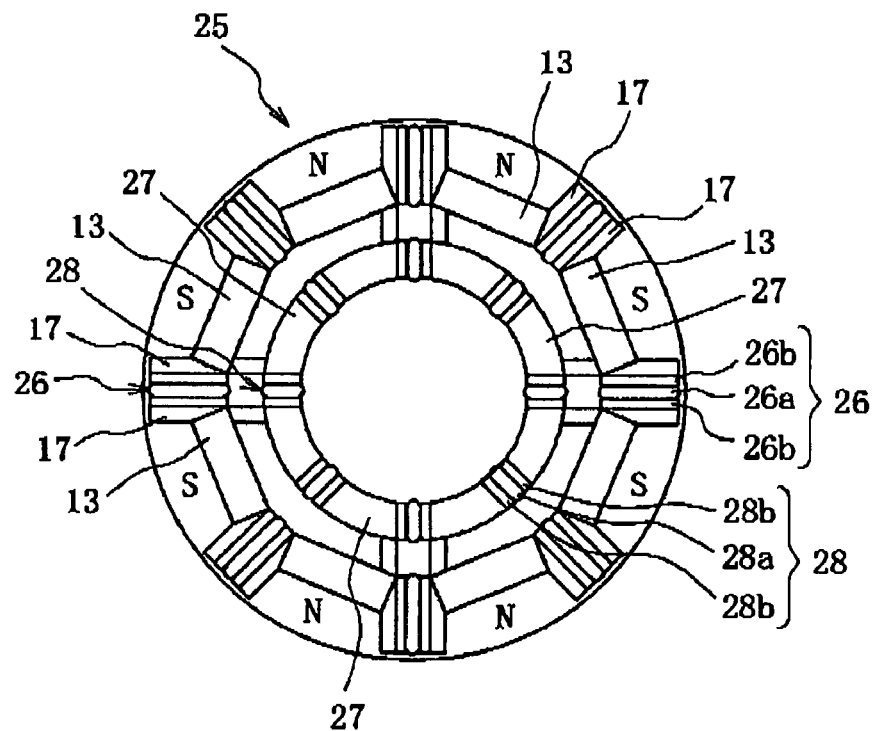
FIG. 4 is a plan view showing a rotor according to a third embodiment of the present invention.

FIG. 4 shows a rotor according to a third embodiment of the present invention. As shown in FIG. 4, in a rotor 25, a plurality of magnetic elements 26 are provided between adjacent air gaps 17 and, instead of the magnetic path switching part 21, air gaps 27 and a plurality of magnetic elements 28 disposed in the air gaps 27 are provided. Other configurations and operations are the same as those of the rotor 20 in the second embodiment.

Figure 5:
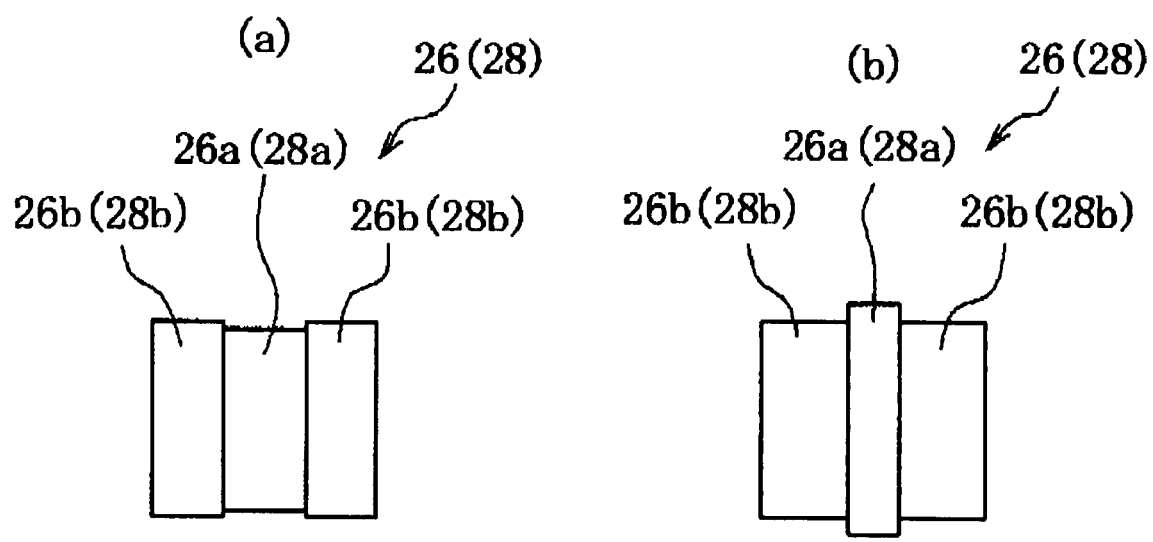
FIG. 5 shows configurations of magnetic elements in FIG. 4.

FIG. 5 shows configurations of each of the magnetic elements in FIG. 4. FIG. 5(a) shows a configuration when a voltage is applied, and FIG. 5(b) shows a configuration when no voltage is applied. As shown in FIG. 5, each of the magnetic elements 26 and each of the magnetic elements 28 have the same configuration, and the magnetic element 26 (28) has a magnetostrictor 26a (28a) and two piezoelectric elements 26b (28b) sandwiching the magnetostrictor 26a (28a) therebetween.

When a voltage is applied to the piezoelectric elements 26b (28b), the piezoelectric elements 26b (28b) are contracted (see FIG. 5(a)). Thereafter, when the voltage application to the piezoelectric elements 26b (28b) is stopped, the piezoelectric elements 26b (28b) are restored to the original condition before contraction. Accordingly, the magnetostrictor 26a (28a) sandwiched between the piezoelectric elements 26b (28b) are compressed from both sides (see FIG. 5(b)). Specifically, when stress is applied to the magnetostrictor 26a (28a), magnetic permeability is changed. Thus, the magnetic permeability can be changed in the magnetic element 26 (28) depending on whether or not the voltage is applied to the piezoelectric elements 26b (28b).

The air gaps 27 are circularly formed so as to have their outer circumferences contact the air gaps 17 provided parallel to each other between magnets 13 of the same pole. In the air gaps 27, the magnetostrictors 28a are disposed at positions corresponding to the respective magnetic elements 26 disposed between the air gaps 17. Specifically, the respective magnetic elements 26 (28) are disposed so as to have polarities differ between a magnetic path connecting the adjacent magnets 13 of the same pole and a magnetic path connecting the adjacent magnets 13 of different poles. Moreover, power is supplied to the piezoelectric elements 26b (28b) by use of a slip ring, a non-contact rotary transformer or the like, and a forward salient-pole structure and an inverse salient-pole structure are switched therebetween by a polarity change during the power supply. Thus, it is possible to carry out a wide-ranging operation which achieves both high torque and high-speed rotation.

As described above, the magnetic elements 26 function as magnetic path switching parts by including the piezoelectric elements 26b (28b) and the magnetostrictors 26a (28a), which are disposed on the magnetic path connecting the magnets 13 of the same pole and the magnetic path connecting the magnets 13 of different poles in the rotor 25. The piezoelectric elements 26b (28b) undergo a contractive change, and each of the magnetostrictors 26a (28a) is sandwiched between the piezoelectric elements 26b (28b) and changes the magnetic permeability in response to the change in the piezoelectric elements 26b (28b). The change in the magnetic permeability by the magnetostrictors 26a (28a) enables switching between the forward salient-pole structure and the inverse salient-pole structure.

Fourth Embodiment

Figure 6:
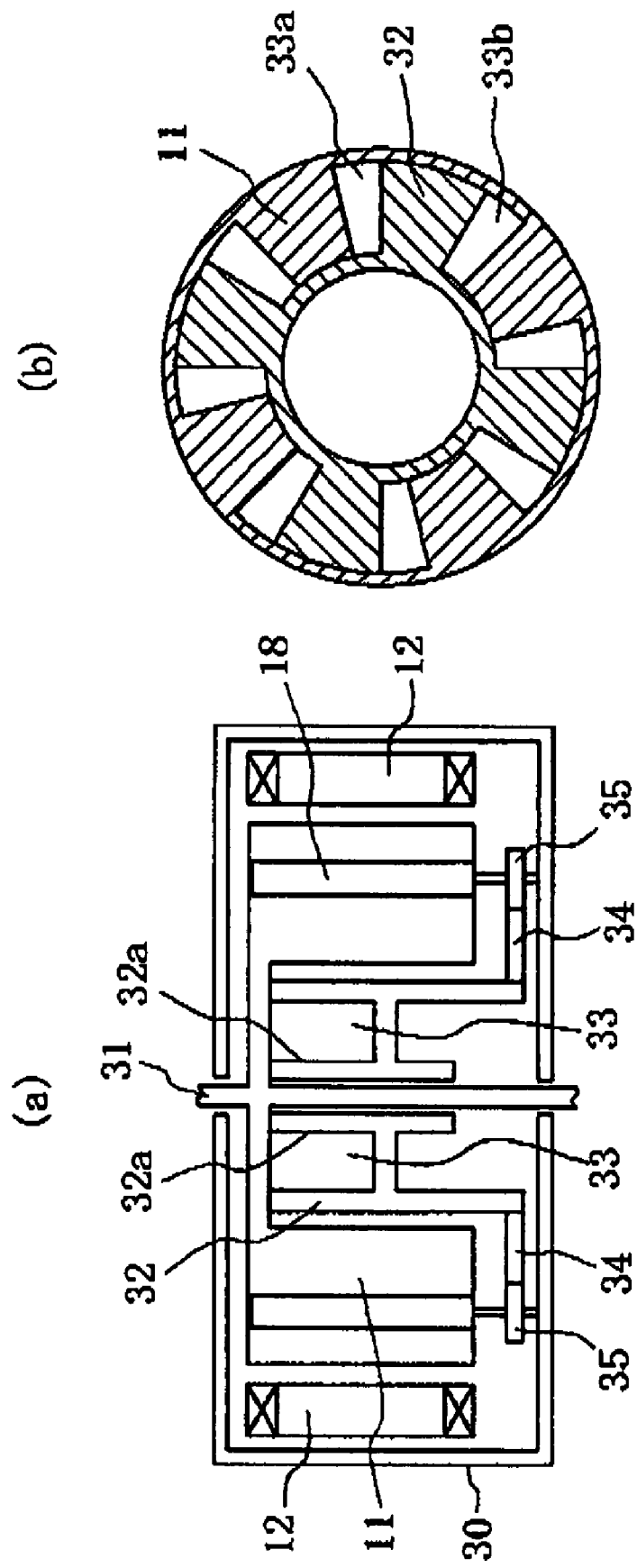
FIG. 6 shows an example of a phase control mechanism in a motor according to the present invention.
Figure 7:
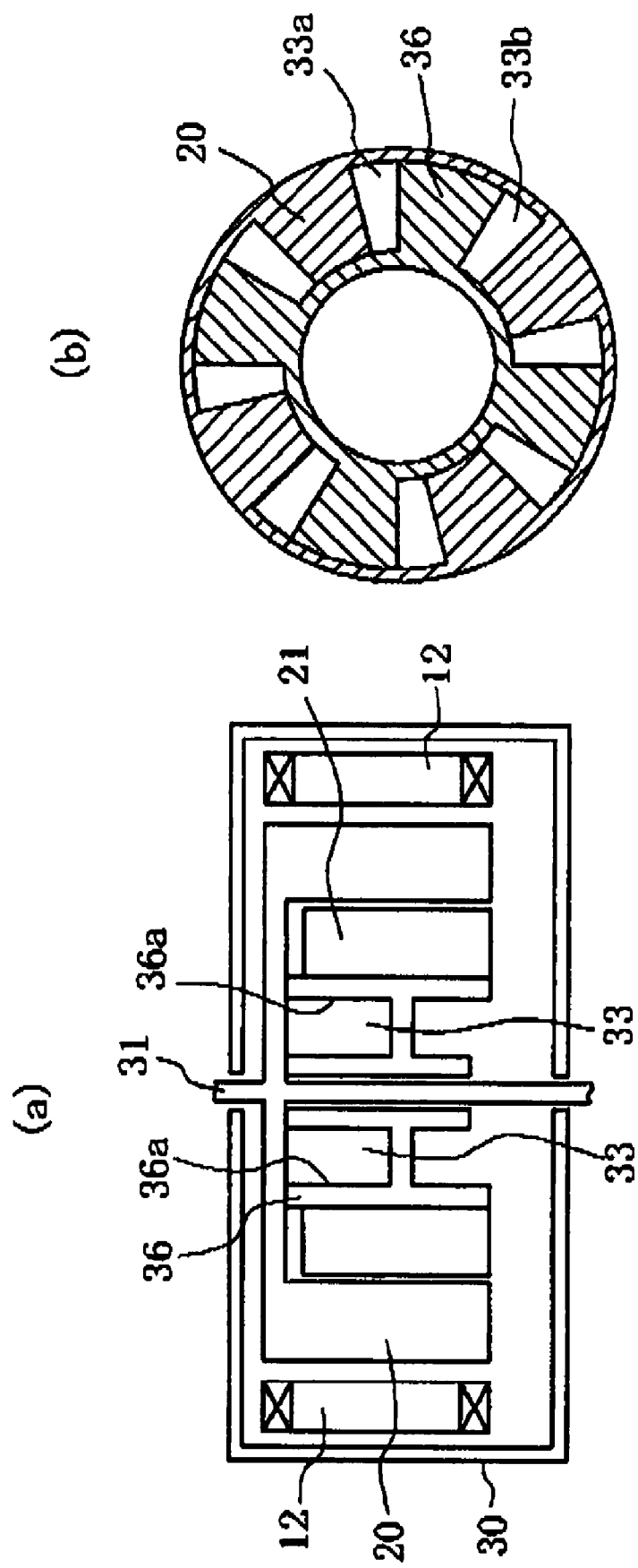
FIG. 7 shows another example of the phase control mechanism in the motor according to the present invention.

FIG. 6 shows an example of a phase control mechanism in a motor according to a fourth embodiment of the present invention. FIG. 6(a) is a cross-sectional view along a rotating shaft, and FIG. 6(b) shows a hydraulic mechanism. FIG. 7 shows another example of the phase control mechanism in the motor according to the present invention. FIG. 7(a) is a cross-sectional view along a rotating shaft, and FIG. 7(b) shows a hydraulic mechanism.

The magnetic path switching parts 18 in the rotor 11 (see FIGS. 2(a) and 2(b)) and the magnetic path switching part 21 in the rotor 20 (see FIGS. 3(a) and 3(b)) according to the present invention can be realized by use of a hydraulic phase control mechanism (see Japanese Patent Application Laid-Open Publication No. 2004-245192) used in an engine valve timing control system, for example.

As shown in FIG. 6, in the case of the magnetic path switching part 18 in the rotor 11 (see FIG. 2) which is rotatably supported by a shaft 31 inside a housing 30, a phase operation part 32 is provided inside the rotor 11, and an oil chamber 32a in the phase operation part 32 is filled with an operating oil 33. Thereafter, any one of an operating oil 33a in an advance oil chamber and an operating oil 33b in a retard oil chamber is supplied, and the other one is discharged. Thus, a phase difference is generated between the rotor 11 and the phase operation part 32. In this event, accurate position control can be performed by use of a position sensor (not shown) and the like. In the case of switching between the forward salient-pole characteristics (see FIG. 2(*a*)) and the inverse salient-pole characteristics (see FIG. 2(*b*)), gears 34 and 35 are attached to the phase operation part 32 and the magnetic path switching part 18 (the member having magnetic anisotropy), respectively, and the both gears 34 and 35 are engaged with each other to switch the magnetic path.

As shown in FIG. 7, in the case of the magnetic path switching part (the second rotor) 21 in the rotor 20 (see FIG. 3) which is rotatably supported by a shaft 31 inside a housing 30, a phase operation part 36 is provided inside the rotor 20, and an oil chamber 36*a* in the phase operation part 36 is filled with an operating oil 33. Thereafter, any one of an operating oil 33*a* in an advance oil chamber and an operating oil 33*b* in a retard oil chamber is supplied, and the other one is discharged. Thus, a phase difference is generated between the rotor 20 and the phase operation part 36. In this event, accurate position control can be performed by use of a position sensor (not shown) and the like. In the case of switching between the forward salient-pole characteristics (see FIG. 3(*a*)) and the inverse salient-pole characteristics (see FIG. 3(*b*)), the phase operation part 36 and the magnetic path switching part 21 are connected with each other to perform the switching.

Note that the effects obtained by the magnetic path switching part can be further enhanced by providing, for example, one or more slit-like flux barriers on the outside of the magnets in the radial direction of the rotor described in each of the above embodiments. Next, description will be given below of a mechanism capable of changing a short-circuit flux content inside the rotor by providing the slit-like flux barriers.

Fifth Embodiment

Figure 8:
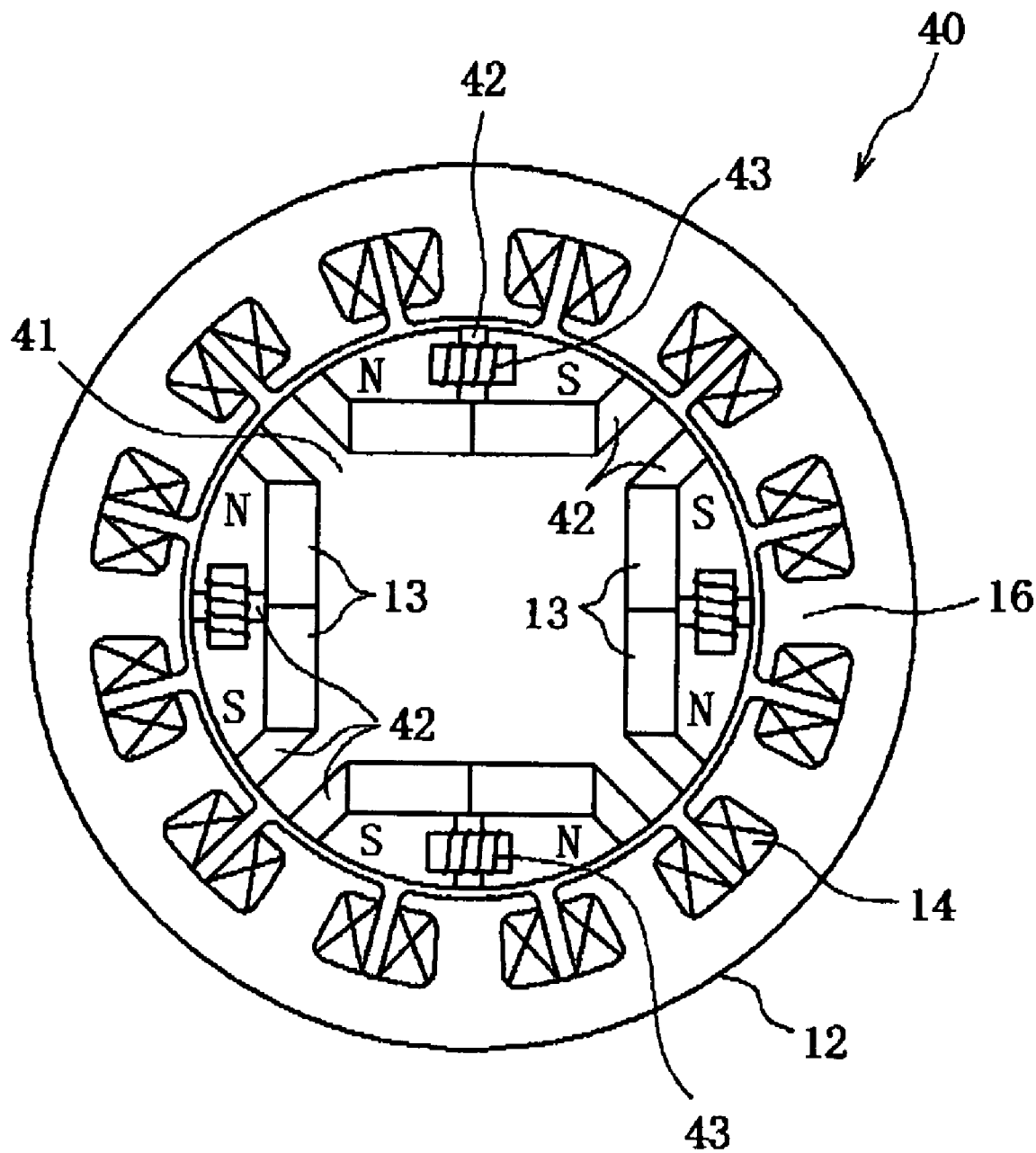
FIG. 8 is a schematic cross-sectional view along a rotating shaft showing an example of a short-circuit flux content variable mechanism in a motor according to a fifth embodiment of the present invention.

FIG. 8 shows an example of a short-circuit flux content variable mechanism in a motor according to a fifth embodiment of the present invention. As shown in FIG. 8, a motor 40 has a rotor 41 rotatably attached to a stator 12. In an outer circumferential portion of the rotor 41, a predetermined number of (8 in this example) magnets 13 are provided in pairs with spaces between adjacent pairs. In each of the pairs, north and south poles are linearly arranged in parallel in a close contact state so as to form a rectangular shape.

At both ends and a junction of each of the pairs of magnets 13 of the north and south poles, flux barriers (slits) 42 for reducing flux leakage are provided along a radial direction of the rotor. Moreover, an air gap 17 is formed so as to be sandwiched between the flux barriers 42 at the both ends of the magnets 13. On the flux barrier 42 between different poles of the magnets (the north pole and the south pole), that is, at the junction of the magnets 13, a coil 43 is disposed. Other configurations and operations are the same as those of the rotor 11 and the stator 12 (see FIG. 1) in the first embodiment.

For example, a slip ring or the like is used to supply power to each of the coils 43 disposed on the flux barriers 42 between different poles of the magnets, and the amount and direction of currents to flow through the coils 43 are controlled according to the number of revolutions of the rotor 41. Thus, the flux content and directions of the magnetic poles can be controlled. As a result, high torque and high power can be obtained. Furthermore, if a teeth portion of the coil 43 is formed by use of a permanent magnet having low holding power, instead of a magnetic body, currents may be allowed to flow only when the directions of the magnetic poles are changed. Thus, efficiency is enhanced.

Moreover, if the teeth portion of the coil 43 is a magnetic body, currents are allowed to flow only in low-speed rotation to obtain an electromagnet. Thus, magnetic force is increased, and effects of the flux barriers 42 can be yielded. Moreover, by not allowing the currents to flow in high-speed rotation, the coil 43 serves as the magnetic body to generate a short-circuit current in the rotor 41. Thus, by fixing the direction of currents flowing through the coils 43 to control only the current amount, high torque and high power can be obtained. Similarly, if the teeth portion of the coil 43 is a non-magnetic body, a mechanism for increasing power generation according to the number of revolutions is provided. Accordingly, the coil 43 serves as the flux barrier 42 in low-speed rotation and also serves as the electromagnet to generate a short-circuit magnetic flux in the rotor 41 in high-speed rotation. Thus, a speed range can be passively extended.

In other words, the coil 43 functions as a magnetic flux short-circuiting mechanism which can change a short-circuit flux content inside the rotor 41. Accordingly, in the motor including the stator 12 having coils 14 and the rotor 41 having the magnets 13 and also having magnetic reluctance smaller in a magnetic path between the same poles of the magnets (between the north poles and between the south poles) than in a magnetic path between different poles of the magnets (between the north pole and the south pole), the short-circuit flux content inside the rotor 41 can be changed according to the number of revolutions by the coils 43 disposed on the flux barriers 42.

Meanwhile, in the conventional PM motor described above, the maximum number of revolutions of the motor is limited to be not larger than a voltage to be applied to the coils from outside by an induced voltage. Moreover, for example, in a rotor disclosed in Japanese Patent Application Laid-Open Publication No. 2004-242462, high-speed rotation is achieved by using a magnetic flux short-circuiting member to short-circuit a magnetic path blocked by flux barriers using centrifugal force. However, in the conventional rotor, an inductance ratio is reduced along with short-circuiting of the flux barriers between different poles which block the magnetic path. Thus, reduction in reluctance torque is inevitable.

Moreover, in a conventional inverse salient-pole motor, flux barriers between different poles are short-circuited, instead of weak field control for allowing a current to flow in a demagnetization direction, in order not to demagnetize magnets. However, in order to obtain reluctance torque, it is required to allow the current to flow in the demagnetization direction after all. Thus, it is required to take a risk of demagnetization.

On the other hand, by disposing the coils 43, which function as the magnetic flux short-circuiting mechanism, on the flux barriers 42, the short-circuit flux content inside the rotor 41 can be changed according to the number of revolutions. Thus, high-speed rotation can be achieved. Accordingly, high-speed rotation can be achieved by intense field control, which is not suitable for the high-speed rotation but has characteristics such as high resistance to demagnetization and heat. As a result, a forward salient-pole motor which generates maximum torque by the intense field control has a small reduction in the inductance ratio when the magnetic path is short-circuited by the magnetic flux short-circuiting mechanism, compared with the inverse salient-pole motor which generates maximum torque by the weak field control. Thus, large reluctance torque can be obtained even in high-speed rotation.

Sixth Embodiment

FIG. 9 shows a rotor in a motor according to a sixth embodiment of the present invention. FIG. 9(a) is a cross-sectional view of a 180-degree model in low-speed rotation, and FIG. 9(b) is a cross-sectional view of the 180-degree model in high-speed rotation. As shown in FIG. 9, in a rotor 45, no coils 43 are provided, and each of flux barriers between different poles of magnets is formed by use of a member capable of changing magnetic permeability, for example, a magnetic element 46 having a magnetostrictor 46b sandwiched between a pair of piezoelectric elements 46a. Other configurations and operations are the same as those of the rotor 41 (see FIG. 8) in the fifth embodiment. Note that the configuration and operations of the magnetic element 46 are the same as those of the magnetic element 26 or the magnetic element 28 (see FIG. 5).

In low-speed rotation of the rotor 45, when a voltage to be applied to the piezoelectric elements 46a is set lower than an open voltage or an operating voltage, the piezoelectric elements 46a compress the magnetostrictor 46b (see FIG. 9(a)). Accordingly, the magnetic permeability is lowered. Thus, the magnetic element 46 serves as the flux barrier. In high-speed rotation of the rotor 45, by applying the operating voltage to the piezoelectric elements 46a, the piezoelectric elements 46a are contracted and the compressed magnetostrictor 46b is restored (see FIG. 9(b)). Thus, the magnetic permeability is increased, and a short-circuit magnetic path is formed inside the rotor 45. Consequently, an induced voltage is reduced, and a speed range is extended.

Seventh Embodiment

FIG. 10 shows a rotor in a motor according to a seventh embodiment of the present invention. FIG. 10(a) is a cross-sectional view of a 180-degree model in low-speed rotation, and FIG. 10(b) is a cross-sectional view of the 180-degree model in high-speed rotation. As shown in FIG. 10, in a rotor 50, no coils 43 are provided, and each of flux barriers between different poles of magnets is formed by use of a rotary member 51 with magnets. The rotary member 51 with magnets is formed by dividing a disk into two halves and forming a north pole on one side and a south pole on the other side, and is rotatably attached to the rotor 50. Other configurations and operations are the same as those of the rotor 41 (see FIG. 8) in the fifth embodiment.

In low-speed rotation of the rotor 50, the rotary member 51 with magnets is phase-controlled so as to set the north and south poles thereof to be the same as those of main magnets 13, respectively (FIG. 10(a)). Thus, a magnetic flux of the magnets 13 is increased, and high torque can be obtained. In high-speed rotation of the rotor 50, the rotary member with magnets 51 is phase-controlled so as to set the north and south poles thereof to be different from those of the main magnets 13, respectively (FIG. 10(b)). Thus, the magnetic flux of the magnets 13 is short-circuited inside the rotor 50. Consequently, an induced voltage is reduced and a speed range is extended.

Eighth Embodiment

FIG. 11 shows a rotor in a motor according to an eighth embodiment of the present invention. FIG. 11(a) is a cross-sectional view showing a 180-degree model in low-speed rotation, and FIG. 11(b) is a cross-sectional view showing the 180-degree model in high-speed rotation. As shown in FIG. 11, in a rotor 55, no coils 43 are provided, and each of flux barriers between different poles of magnets is formed by use of a magnetic anisotropy rotary member 56. Other configurations and operations are the same as those of the rotor 41 (see FIG. 8) in the fifth embodiment.

In low-speed rotation of the rotor 55, the magnetic anisotropy rotary member 56 is phase-controlled so as to serve as the flux barrier (see FIG. 11(a)). Moreover, in high-speed rotation of the rotor 55, the magnetic anisotropy rotary member 56 is phase-controlled so as to form a short-circuit magnetic path inside the rotor 55 (see FIG. 11(b)). Accordingly, a magnetic flux of magnets 13 is short-circuited inside the rotor 55, and an induced voltage is reduced. Thus, a speed range is extended.

Ninth Embodiment

FIG. 12 shows a rotor in a motor according to a ninth embodiment of the present invention. FIG. 12(a) is a cross-sectional view showing a 180-degree model in low-speed rotation, and FIG. 12(b) is a cross-sectional view showing the 180-degree model in high-speed rotation. As shown in FIG. 12, a rotor 60 has, instead of coils 43, magnetic bodies 61 on flux barriers 42 between magnets 13 of different poles, which are extended toward the center of a rotor plane beyond the magnets. Specifically, the magnetic bodies 61 are attached so as to be slidable along the flux barriers 42. Each of the magnetic bodies 61 is connected to an biasing member 62, such as a coil spring, for example, and is constantly positioned on a side toward the center of the rotor plane on the flux barrier 42, in other words, on the magnets 13, by biasing force of the biasing member 62. Other configurations and operations are the same as those of the rotor 41 (see FIG. 8) in the fifth embodiment.

In low-speed rotation of the rotor 60, since centrifugal force is small, the magnetic body 61 is positioned on the side toward the center of the rotor plane by the biasing force of the biasing member 62 (see FIG. 12(a)) and does not form a short-circuit magnetic path inside the rotor 60. However, in high-speed rotation of the rotor 60, as the centrifugal force is increased, the magnetic body 61 is positioned on the flux barrier 42 against the biasing force of the biasing member 62 (see FIG. 12(b)) and forms the short-circuit magnetic path inside the rotor 60. Thus, an induced voltage is reduced, and a speed range is extended.

Tenth Embodiment

FIG. 13 shows a rotor in a motor according to a tenth embodiment of the present invention. FIG. 13(a) shows a state in low-speed rotation, and FIG. 13(b) shows a state in high-speed rotation. As shown in FIG. 13, in a rotor 65, no coils 43 are provided, and each of flux barriers between different poles of magnets is formed by use of a gap 66 provided along a vertical axis inside the rotor 65, a magnetic fluid 67 and a non-magnetic fluid 68, which are put inside the gap 66, and a partition member 69 for separating the magnetic fluid 67 and the non-magnetic fluid 68 from each other. Other configurations and operations are the same as those of the rotor 41 (see FIG. 8) in the fifth embodiment.

When the rotor 65 is rotated, the partition member 69 is moved in the vertical axis direction inside the gap 66 by a difference in pressure between the magnetic fluid 67 and the non-magnetic fluid 68. Thus, in low-speed rotation of the rotor 65, a pressure is applied from the non-magnetic fluid side toward the magnetic fluid side to fill the gap 66 with the non-magnetic fluid (see FIG. 13(a)), and no short-circuit magnetic path is formed inside the rotor 65. By contrast, in high-speed rotation, a pressure is applied from the magnetic fluid side toward the non-magnetic fluid side to fill the gap 66 with the magnetic fluid (see FIG. 13(*b*)), and the short-circuit magnetic path is formed inside the rotor 65. Thus, an induced voltage is reduced, and a speed range is extended.

Eleventh Embodiment

FIG. 14 shows a rotor in a motor according to an eleventh embodiment of the present invention. FIG. 14(*a*) is a cross-sectional view showing a 180-degree model in low-speed rotation, and FIG. 14(*b*) is a cross-sectional view showing the 180-degree model in high-speed rotation. As shown in FIG. 14, a rotor 70 has no coils 43 provided therein, and includes a first rotor 71 having magnets 13 of different poles arranged so as to be separated from each other and a second rotor 73, which is rotatably provided inside the first rotor 71, and which has magnets 72 arranged in a close contact state so as to correspond to a separated portion between the magnets 13 in the first rotor 71. Moreover, flux barriers 74 are provided at the center of the separated portion between the respective magnets 13 in the first rotor 71 and between the respective magnets 13 in the first rotor 71 and the respective magnets 72 in the second rotor 73. Other configurations and operations are the same as those of the rotor 41 (see FIG. 8) in the fifth embodiment.

Specifically, the rotor 70 described above includes the first rotor 71 to be a main part for obtaining magnet torque and the second rotor 73 for generating a short-circuit magnetic flux inside the rotor 70. Moreover, the first and second rotors 71 and 73 are phase-controlled. In low-speed rotation of the rotor 70, no short-circuit magnetic path is formed inside the rotor 70 (see FIG. 14(*a*)). However, in high-speed rotation thereof, a short-circuit magnetic path between different poles of the magnets in the first rotor 71 is formed through the second rotor 73 (see FIG. 14(*b*)). Thus, an induced voltage is reduced, and a speed range is extended.

Twelfth Embodiment

FIG. 15 shows a rotor in a motor according to a twelfth embodiment of the present invention. FIG. 15(*a*) shows a state in low-speed rotation, and FIG. 15(*b*) shows a state in high-speed rotation. As shown in FIG. 15, a rotor 75 has no coils 43 provided therein, and is formed by use of first and second rotors 76 and 77 obtained by dividing the rotor 75 in half in a vertical axis direction. Moreover, the first and second rotors 76 and 77 are phase-controlled. Other configurations and operations are the same as those of the rotor 41 (see FIG. 8) in the fifth embodiment.

In low-speed rotation of the rotor 75, magnets 13 in the first and second rotors 76 and 77 are set to have the same pole (see FIG. 15(*a*)). Thus, no short-circuit magnetic path in the vertical axis direction is formed inside the rotor 75. By contrast, in high-speed rotation of the rotor 75, the magnets 13 in the first and second rotors 76 and 77 are set to have different poles from each other (see FIG. 15(*b*)). Thus, the short-circuit magnetic path in the vertical axis direction is formed inside the rotor 75. Consequently, an induced voltage is reduced, and a speed range is extended.

As described above, the motor according to the present invention includes: a plurality of magnets arranged therein; a rotor having magnetic reluctance smaller in a magnetic path between the same poles of the magnets than in a magnetic path between different poles of the magnets; and a magnetic flux short-circuiting mechanism for changing a short-circuit flux content inside the rotor according to the number of revolutions of the rotor. Moreover, the magnetic flux short-circuiting mechanism has a configuration in which coils are disposed on flux barriers between different poles of the magnets or a configuration in which the flux barriers between different poles of the magnets are formed by use of members capable of changing magnetic permeability. Moreover, the magnetic flux short-circuiting mechanism has a configuration in which the flux barriers between different poles of the magnets are formed by use of rotary members with magnets, a configuration in which the flux barriers between different poles of the magnets are formed by use of magnetic anisotropy rotary members or a configuration in which magnetic bodies connected to biasing members are mounted on the flux barriers between different poles of the magnets. Moreover, the magnetic flux short-circuiting mechanism has a configuration in which each of the flux barriers between different poles of the magnets is formed by use of a gap inside the rotor, a magnetic fluid and a non-magnetic fluid inside the gap, and a partition member for separating the magnetic fluid and the non-magnetic fluid from each other. Moreover, the magnetic flux short-circuiting mechanism has a configuration in which the rotor has a first rotor to be a main part for obtaining magnet torque and a second rotor for generating a short-circuit magnetic flux inside the rotor, and the first and second rotors are phase-controlled. Furthermore, the magnetic flux short-circuiting mechanism has a configuration in which the rotor has a plurality of rotors divided in an axial direction of the rotor, and the plurality of rotors are phase-controlled.

Thirteenth Embodiment

Figure 16:
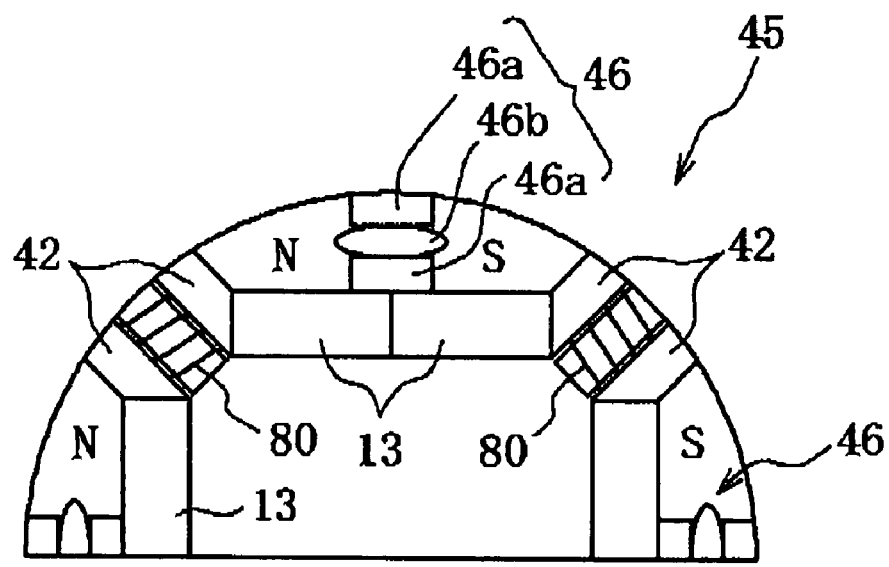
FIG. 16 is a cross-sectional view of a 180-degree model in a rotor, showing an example of a power supply mechanism according to the fifth embodiment.

FIG. 16 is a cross-sectional view of the 180-degree model of the rotor, showing an example of a power supply mechanism according to the fifth and sixth embodiments. As shown in FIG. 16, as a power supply mechanism in the fifth embodiment (see FIG. 8) and the sixth embodiment (see FIGS. 9(*a*) and 9(*b*)), coils 80 are provided in magnetic paths between the same poles of the magnets in the rotor (as an example, the case of the rotor 45 in the sixth embodiment (see FIG. 9) is shown). The coils 80 in the rotor 45 generate no induced voltage by application of fundamental components. However, the coils 80 generate the induced voltage by application of components of an order higher than the first order. In the case where the motor is actually operated, since harmonic components exist, the induced voltage is generated without applying higher harmonic waves. Accordingly, power supply can be performed through a diode bridge (not shown).

Thus, in high-speed rotation of the rotor (41 or 45), the induced voltage is increased. As a result, in the fifth embodiment (see FIG. 8), magnetic force is increased by an increase in currents to flow through the coils 80. Moreover, in the sixth embodiment (see FIG. 9), the piezoelectric elements 46*a* are operated when the induced voltage exceeds a threshold voltage.

The switching of the magnetic path in the seventh embodiment (see FIG. 10), the eighth embodiment (see FIG. 11), the eleventh embodiment (see FIG. 14) and the twelfth embodiment (see FIG. 15) described above can be performed by use of the hydraulic phase control mechanism used in the engine valve timing control system, for example.

The switching between the low-speed rotation and the high-speed rotation in the seventh embodiment (see FIG. 10) and the eighth embodiment (see FIG. 11) is performed by attaching the gears 34 and 35 to the phase operation part 32 and the magnetic path switching part 18 (the member having magnetic anisotropy), respectively, and engaging the gears 34 and 35 with each other (see FIG. 6(*a*)). The switching between the low-speed rotation and the high-speed rotation in the eleventh embodiment (see FIG. 14) is performed by connecting the phase operation part 32 with the second rotor 73 for switching the magnetic path.

Figure 17:
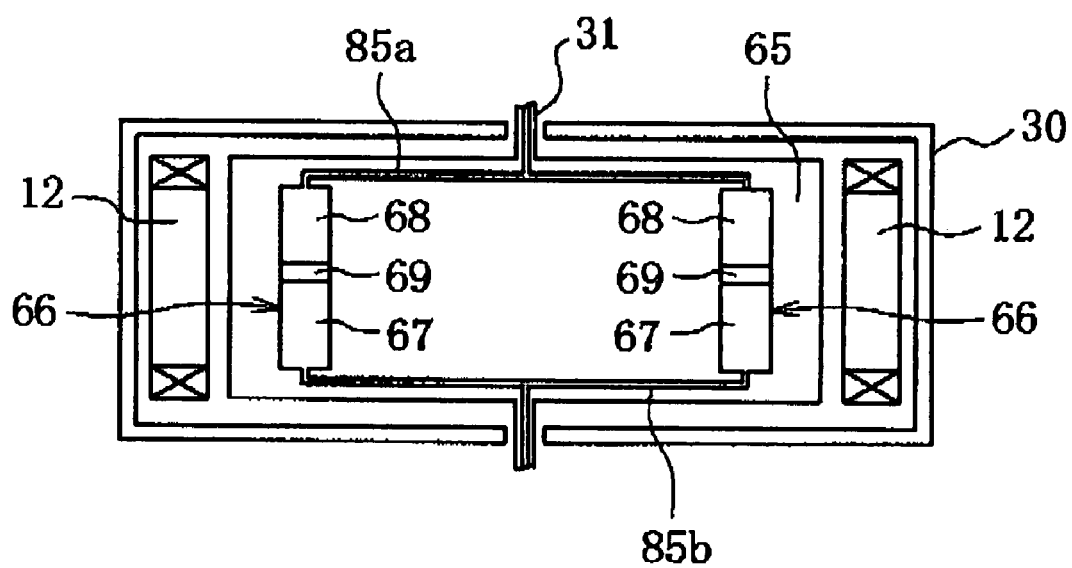
FIG. 17 is a cross-sectional view along a rotating shaft, showing an example of a phase control mechanism according to the tenth embodiment.

FIG. 17 is a cross-sectional view along a rotating shaft, showing an example of a phase control mechanism according to the tenth embodiment. As shown in FIG. 17, the rotor 65 having the plurality of gaps 66 formed therein, which are included in a magnetic path switching mechanism in the tenth embodiment (see FIG. 13) is rotatably mounted on the shaft 31 inside the housing 30 of the motor. Moreover, the respective gaps 66 are connected to upper and lower passages 85a and 85b which communicate with both ends of the respective gaps 66, and which penetrate through both ends of the shaft 31, respectively. The non-magnetic fluid 68 flows inside the upper passage 85a, and the magnetic fluid 67 flows inside the lower passage 85b.

FIG. 18 shows an example of a phase control mechanism according to the twelfth embodiment. FIG. 18(a) is a cross-sectional view along a rotating shaft, and FIG. 18(b) shows a hydraulic mechanism. As shown in FIG. 18, the rotor 75 is formed by use of the first and second rotors 76 and 77 obtained by dividing the rotor 75 in half in the vertical axis direction, and the first and second rotors 76 and 77 are phase-controlled (the twelfth embodiment, see FIG. 15). In this case, a phase operation part 36 is provided inside the rotor 75, and an oil chamber 36a in the phase operation part 36 is filled with an operating oil 33. Thereafter, any one of an operating oil 33a in an advance oil chamber and an operating oil 33b in a retard oil chamber is supplied, and the other one is discharged. Thus, a phase difference is generated between the rotor 75 and the phase operation part 36. In this event, accurate position control can be performed by use of a position sensor (not shown) and the like. The switching between the low-speed rotation and the high-speed rotation in the twelfth embodiment (see FIG. 15) is performed by connecting the phase operation part 32 with the second rotor 77 for switching the magnetic path.

As described above, according to the present invention, the magnetic path of the rotor is switched by the magnetic path switching part provided in the rotor having the plurality of magnets arranged therein to select the intense field control as the forward salient-pole structure or the weak field control as the inverse salient-pole structure. Thus, the motor can efficiently perform the intense field control and the weak field control by having both of the forward salient-pole characteristics and the inverse salient-pole characteristics, which are opposite to each other. As a result, it is possible to perform a wide-ranging operation which achieves both high torque and high-speed rotation (high power).

Note that, in the above embodiments, the description was given of a radial gap motor having a rotor on its inside. However, the present invention is not limited thereto but can be realized by a radial gap motor having a rotor on its outside, an axial gap motor and the like. Moreover, in the above embodiments, the description was given of the IPM motor. However, the present invention is not limited thereto but can be realized by a surface magnet motor. Furthermore, the shape of the stator, the number of poles of the rotor, and the like are not limited to those described above, either.

The entire contents of Japanese Patent Applications No. 2005-65153 (filed: Mar. 9, 2005) and No. 2005-249674 (filed: Aug. 30, 2005) are incorporated herein by reference.

Although the contents of the present invention have been described above in accordance with the embodiments and the examples, it is apparent to those skilled in the art that the present invention is not limited to the above descriptions but various changes and modifications can be made.

INDUSTRIAL APPLICABILITY

According to the present invention, the magnetic path of the rotor is switched by the magnetic path switching part provided in the rotor having the plurality of magnets arranged therein to select the intense field control as the forward salient-pole structure or the weak field control as the inverse salient-pole structure. Thus, the motor can efficiently perform the intense field control and the weak field control by having both of the forward salient-pole characteristics and the inverse salient-pole characteristics, which are opposite to each other. As a result, it is possible to perform a wide-ranging operation which achieves both high torque and high-speed rotation.

The invention claimed is:

1. A motor comprising:
   a stator having first coils;
   a rotor, which is disposed so as to be rotatable with respect to the stator, having a forward salient-pole structure, wherein a plurality of magnets having north poles and south poles are alternately arranged two by two along a circumferential direction, such that different poles of the magnets are linearly arranged next to each other along the circumferential direction;
   wherein the different poles of the magnets that are linearly arranged next to each other along the circumferential direction are in contact with each other; and
   a magnetic flux short-circuiting mechanism, which is provided in the rotor and changes a short-circuit flux content inside the rotor according to a number of revolutions of the rotor.

2. The motor according to claim 1, wherein the magnetic flux short-circuiting mechanism has a configuration in which second coils are disposed on flux barriers between different poles of the magnets.

3. The motor according to claim 1, wherein the magnetic flux short-circuiting mechanism has a configuration in which flux barriers between different poles of the magnets are formed by use of members capable of changing magnetic permeability.

4. The motor according to claim 1, wherein the magnetic flux short-circuiting mechanism has a configuration in which flux barriers between different poles of the magnets are formed by use of rotary members with magnets.

5. The motor according to claim 1, wherein the magnetic flux short-circuiting mechanism has a configuration in which flux barriers between different poles of the magnets are formed by use of magnetic anisotropy rotary members.

6. The motor according to claim 1, wherein the magnetic flux short-circuiting mechanism has a configuration in which each of flux barriers between different poles of the magnets is formed by use of a gap inside the rotor, a magnetic fluid and a non-magnetic fluid inside the gap, and a partition member for separating the magnetic fluid and the non-magnetic fluid from each other.

7. The motor according to claim 1, wherein:
   the rotor has a plurality of rotors divided in an axial direction of the rotor, and
   the magnetic flux short-circuiting mechanism is configured to perform phase control of the plurality of rotors.

8. A motor comprising:
   a stator having first coils;
   a rotor, which is disposed so as to be rotatable with respect to the stator, having a forward salient-pole structure, the rotor having a first rotor to be a main part for obtaining magnet torque and a second rotor for generating a short-circuit magnetic flux inside the first rotor, wherein the first rotor has a plurality of magnets having north poles and south poles which are alternately arranged two by two along a circumferential direction, such that different poles of the magnets are linearly arranged next to each other along the circumferential direction, and wherein the second rotor has a plurality of magnets having north poles and south poles which are alternately arranged two by two along a circumferential direction, such that different poles of the magnets are arranged next to each other along the circumferential direction, wherein the different poles of the magnets that are arranged next to each other along the circumferential direction are in contact with each other; and a magnetic flux short-circuiting mechanism, which is provided in the rotor and changes a short-circuit flux content inside the rotor according to a number of revolutions of the rotor, wherein the magnetic flux short-circuiting mechanism is configured to perform phase control of the first and second rotor.

9. The motor according to claim 8, wherein the different poles are in direct contact with one another.

10. A motor comprising:
a stator having first coils;
a rotor, which is disposed so as to be rotatable with respect to the stator, having a forward salient-pole structure;
wherein a plurality of magnets having north poles and south poles are alternately arranged two by two along a circumferential direction, such that different poles of the magnets are linearly arranged next to each other along the circumferential direction;
wherein flux barriers are provided between the different poles of the magnets that are linearly arranged next to each other along the circumferential direction such that the flux barriers each about both of the different poles; and
a magnetic flux short-circuiting mechanism, which is provided in the rotor and changes a short-circuit flux content inside the rotor according to a number of revolutions of the rotor.

11. The motor according to claim 10, wherein the magnetic flux short-circuiting mechanism has a configuration in which magnetic bodies connected to biasing members are mounted on the flux barriers.

* * * * *